United States Patent [19]

Kurita

[11] Patent Number: 4,864,518

[45] Date of Patent: Sep. 5, 1989

[54] PROPORTIONAL SPACING DISPLAY APPARATUS

[75] Inventor: Kikuo Kurita, Hirakata, Japan

[73] Assignee: Minolta Camera Kabushiki Kaisha, Osaka, Japan

[21] Appl. No.: 94,310

[22] Filed: Sep. 4, 1987

[30] Foreign Application Priority Data

Sep. 4, 1986 [JP] Japan ................................ 61-208758

[51] Int. Cl.[4] ............................................ G06F 15/626

[52] U.S. Cl. .................................... 364/521; 340/750; 340/748

[58] Field of Search ............... 340/709, 721, 723, 731, 340/747, 748, 750, 720, 733; 400/4/83; 364/519, 521, 520

[56] References Cited

U.S. PATENT DOCUMENTS 3,267,454 8/1966 Schaff ............................ 340/748 X
3,281,822 10/1966 Evans ................................ 340/748
3,588,873 6/1971 Osborne et al. ..................... 340/748
3,754,229 8/1973 Manber .......................... 340/750 X
3,952,296 4/1976 Bates ............................. 340/750 X
4,348,738 9/1982 Grier et al. ........................ 400/4 X
4,555,763 11/1985 Dahme ........................... 340/748 X

*Primary Examiner*—A. D. Pellinen
*Assistant Examiner*—A. Jonathan Wysocki
*Attorney, Agent, or Firm*—Price, Gess & Ubell

[57] ABSTRACT

A proportional spacing display apparatus for displaying characters on a display screen with spacings corresponding to types of character. One character display cycle comprises a half cycle for reading character data from a video memory and a half cycle for rewriting the character data in the video memory. The character data reading half cycle has a fixed time period necessary for data reading, while the character data rewriting half cycle has a time period variable with character widths.

7 Claims, 4 Drawing Sheets

PROPORTIONAL SPACING DISPLAY APPARATUS

BACKGROUND OF THE INVENTION (1) Field of the Invention

The present invention relates to a proportional spacing display apparatus for displaying characters with the pitches correspondent with types of character on the screen of a display device such as a CRT.

(2) Description of the Prior Art

With a word processor having a document editing function and comprising an image display and a typewriter, for example, the image display generally shows characters with a fixed pitch whereas the typewriter, when the proportional spacing mode is selected, is capable of printing the characters with corresponding widths, which are pleasing to the eye.

This characteristic of the above word processor entails the following disadvantage in use.

When the proportional spacing mode is selected for the typewriter, printed lines include various numbers of characters depending on the types of character. These lines, when shown on the display which provides a constant pitch display, are unjustified at the righthand end which presents a poor appearance. It would be convenient to the operator in preparing a document if the display presents characters in the form in which the characters are printed. However, the above type of word processor is awkward to use since the lines are justified on the typewriter but not on the display.

For such a word processor, what is known as proportional spacing display system has been developed which enables characters to presented on the display with widths correspondent with the types of character. However, this system varies the frequency of a dot clock with the types of character, which requires a very complicated and expensive circuitry.

SUMMARY OF THE INVENTION

A primary object of the present invention, therefore, is to provide an improved proportional spacing display apparatus which is capable of presenting characters on a display screen with widths correspondent with the types of character.

Another object of the present invention is to provide a proportional spacing display apparatus capable of displaying characters with widths correspondent with the types of character without varying the dot clock frequency.

A further object of the invention is to provide a low cost proportional spacing display apparatus having a simple circuit construction.

In order to fulfill the above objects a proportional spacing display apparatus according to the present invention comprises data memory means storing character data; character data reading means for reading selected character data from the data memory means for display; data rewriting means for rewriting the character data stored in the data memory means; control means for allocating a fixed character data reading period and varying a character data rewriting period in accordance with the widths of characters; and display means for displaying a character on the display device during one character display cycle corresponding to a sum of the character data reading period and the character data rewriting period determined by the control means.

Specifically, the data memory means comprises a video memory including a character memory storing character codes and an attribute memory storing attributes other than the characters. The character memory is connected to a character data generator for generating a bit pattern corresponding to a character code read out of the character memory, the character data generator being provided with a bit eliminator for displaying characters with varied pitches from one character bit pattern, and an output selector. Further, the character memory is connected to a decoder for outputting a character width code corresponding to a character code read out of the character memory.

In a specific example of the above display apparatus, the character data reading means comprises a controller for providing a display screen with synchronizing signals and an address counter for providing the data memory means with an address signal. The controller receives clock pulses having a fixed cycle and the address counter receives a character clock having pulsewidths variable with character widths, thereby to effect address renewals.

In a further example of the apparatus, the data rewriting means comprises a central processing unit.

The control means may include a clock pulse generator, a first counter for counting the clock pulses equivalent of the number of clock pulses corresponding to a character width, a second counter for counting a predetermined number of clock pulses in response to a set strobe generated upon completion of count by the first counter, and a flip-flop settable by the set strobe generated by the first counter and resettable by a reset strobe generated upon completion of count by the second counter. The number of clock pulses counted by the second counter is set to a number corresponding to a minimum time period required for the reading means to make access to the data memory means for reading the character data from the data memory means. The flip-flop generates a character clock which comprises a first half cycle having a variable time period determined by the first counter and a second half cycle having fixed time period determined by the second counter. The character clock is fed to a multiplexer for selectively providing an address signal generated by the data reading means and an address signal generated by the data rewriting means for the data memory means, to control a switching timing of the multiplexer. The data rewriting is effected during the first half cycle having the variable time period determined by the first counter only when the time period is sufficiently long for making access and there is an access request from the data rewriting means.

The character data may be rewritten in and read from the data memory means by a switching effected by a multiplexer between address designation signals provided by the data rewriting means and the data reading means.

According to the present invention, one character display cycle determines the width of the character to be displayed. The proportional spacing display is effected by adjusting this display cycle with the first half cycle (CPU cycle) allocated for data rewriting. In this case, when the character width is narrower than the predetermined width, the CPU cycle has only a short period which is inadequate for allowing the CPU to make access to the video memory, but the CPU can make access to the vide memory during a subsequent display cycle for a wide character. If an access time for the CPU is not secured during subsequent cycles, the access may be made during a horizontal blanking period after horizontal scanning of the display.

Thus the present invention produces the following effects.

In the first place, the proportional spacing display may be provided on the display screen as well wherein characters are displayed with widths correspondent with the types of character. The invention is applicable to a word processor having a document editing function and including a typewriter and a display, whereby the display shows lines of characters in the same form as they are printed. This renders the word processor very convenient to use.

Secondly, the invention permits a relatively slow and inexpensive memory to be employed as the video memory. This is possible because the proportional spacing display is effected by using a character clock having pulsewidths variable with the types of character, the pulsewidth variations being adjusted during the CPU cycle in each display cycle, with the remaining half cycle (display sequencer cycle) being fixed to a time period necessary for access to the video memory.

Thirdly, for video access control (arbitration), the invention employs the above method, i.e. The cycle steal system. This system enables the CPU to carry out data reading and writing in parallel with the character display during a display cycle for a wide character, which leads to an efficient use of the CPU.

Fourthly, since the width of a displayed character is adjusted during the CPU cycle period, the frequency of the dot clock is constant regardless of the types of character. This is effective to avoid complication of the circuitry and to realize a low cost apparatus.

BRIEF DESCRIPTION OF THE DRAWINGS

These and other objects or features of the present invention will become apparent from the following description of a preferred embodiment thereof taken in conjunction with the accompanying drawings, in which.

DETAILED DESCRIPTION OF THE INVENTION

Figure 1:
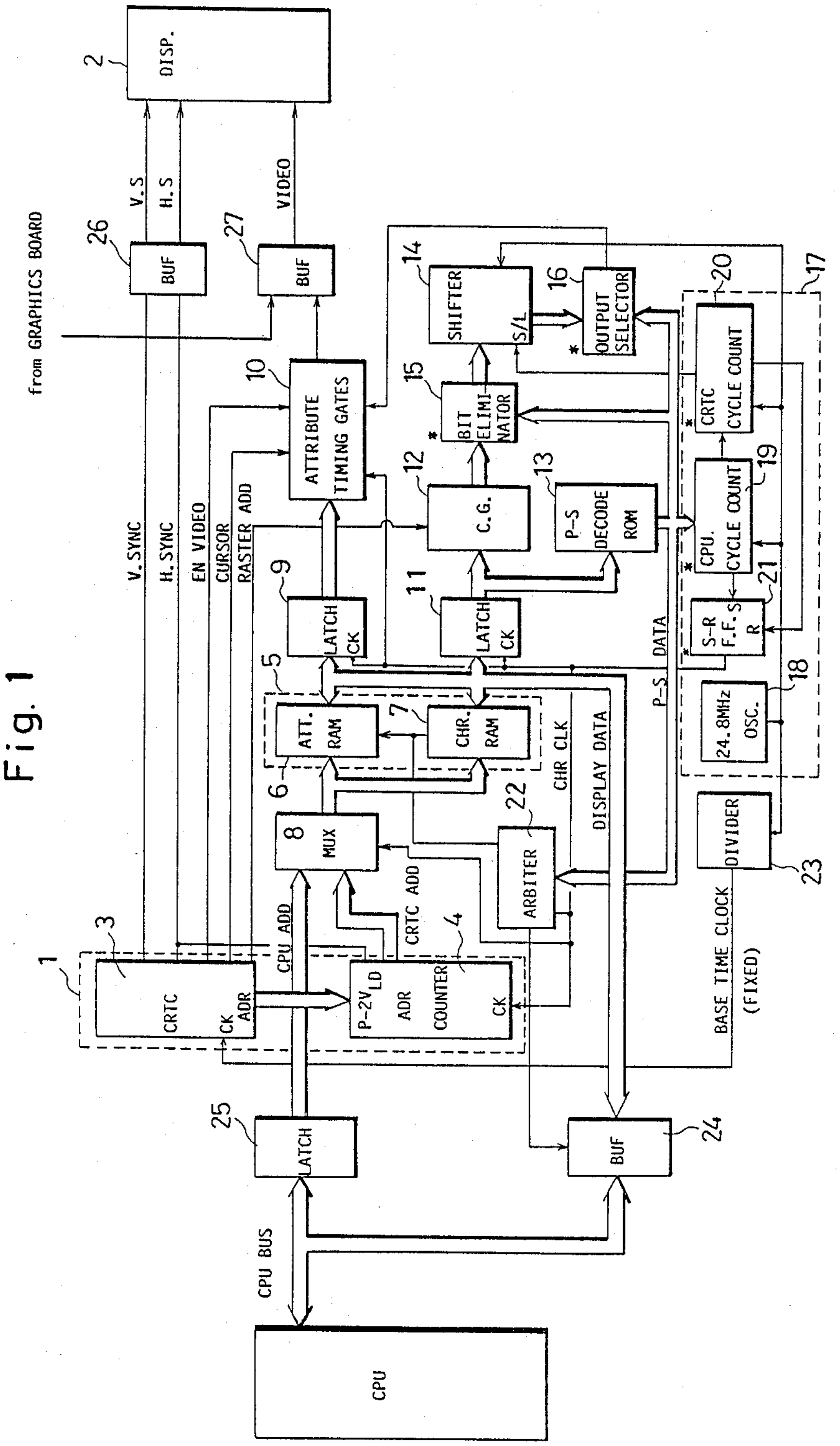
FIG. 1 is a circuit diagram of a proportional spacing display apparatus according to one embodiment of the present invention.
Figure 2A:
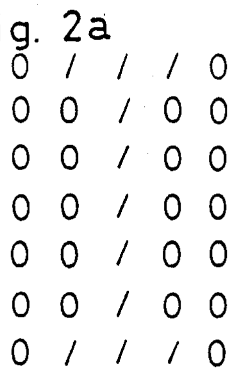
FIGS. 2 and 3 are views illustrating character display operations.
Figure 3A:
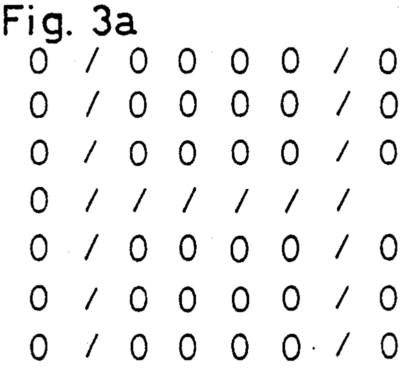
Figure 2B:
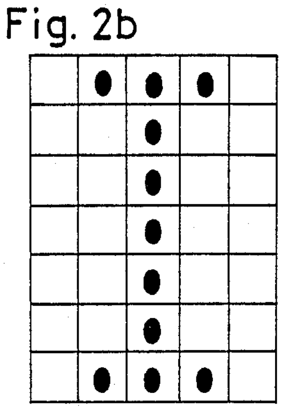
Figure 3B:
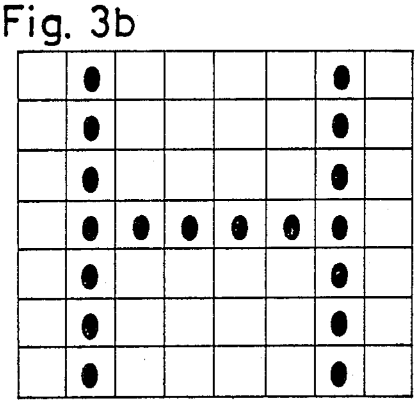
Figure 2C:
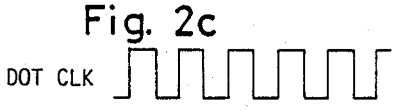
Figure 3C:
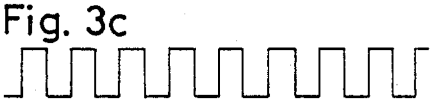
Figure 2D:
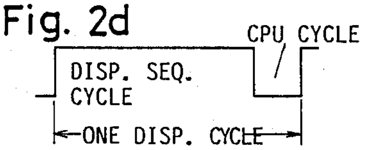
Figure 3D:
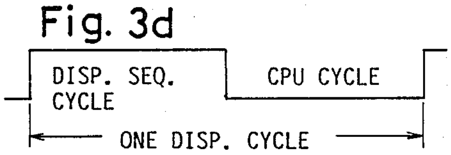

FIG. 1 is a diagram showing a circuitry according to the present invention. This circuitry comprises a display sequencer 1 and a display 2 such as a CRT. The display sequencer includes a CRT controller 3 for generating necessary signals such as horizontal and vertical synchronizing signals H-SYNC and V-SYNC for transmission to the display 2, a video enable signal EN VIDEO and a cursor signal CURSOR, and an address counter 4 for proportional spacing display. This display sequencer comprises an HD68451 manufactured by Hitachi, for example. The circuitry further comprises a video RAM 5 including an attribute RAM 6 and a character RAM 7. The attribute RAM 6 stores character attributes such as brightness, whether characters are blinking or not and whether the characters are reversed or not. The character RAM 7 stores types of character. Address designation for the video RAM 5 is effected either by an address signal from the display sequencer or an address signal from a CPU, which is selected by a multiplexer 8. The selection by the multiplexer 8 of one of these address signals is controlled by a character clock applied to the multiplexer 8. When the multiplexer 8 selects the address signal from the display sequencer, character data stored at addresses in the video RAM 5 designated by this address signal are read out. On the other hand, when the address signal from the CPU is selected, data at addresses designated by this address signal are rewritten. Attribute data output from the attribute RAM 6 when the address signal from the display sequencer is selected are subjected to timing adjustment at a latch 9 and are thereafter input to attribute timing gates 10 for application of the attributes to a video signal. Character code data output from the character RAM 7 are subjected to timing adjustment at a latch 11 and are thereafter input to a character generator 12 and a proportional spacing decode memory 13 (which comprises a ROM in this embodiment).

The character generator 12 outputs a character bit pattern corresponding to a character code. When the character code is a data for displaying "I" for example, the character bit pattern is in the form shown in FIG. 2(*a*). When the character code is for displaying "H", the pattern is in the form shown in FIG. 3(*a*). The bit pattern is subjected to parallel to serial conversion at a shift register 14 and is then input to the attribute timing gates 10 as the video signal. The illustrated example of circuitry includes a bit eliminator 15 disposed upstream of the shift register 14 for producing characters with varied pitches from the same character bit pattern, and an output selector 16 downstream of the shift register 14. These additional circuits 15 and 16, however, are not necessary if the character generator 12 is provided with bit patterns corresponding to the varied pitches.

The proportional spacing decode memory 13 outputs a character width code corresponding to the character code. When the character code is for "I" for example, the memory 13 outputs a character width code equivalent of dot clock number 5. When the character code is for "H", the memory 13 outputs a character width code equivalent of dot clock number 8. The character width data output from this proportional spacing decode ROM are input to a character clock generating circuit 17.

Figure 4:
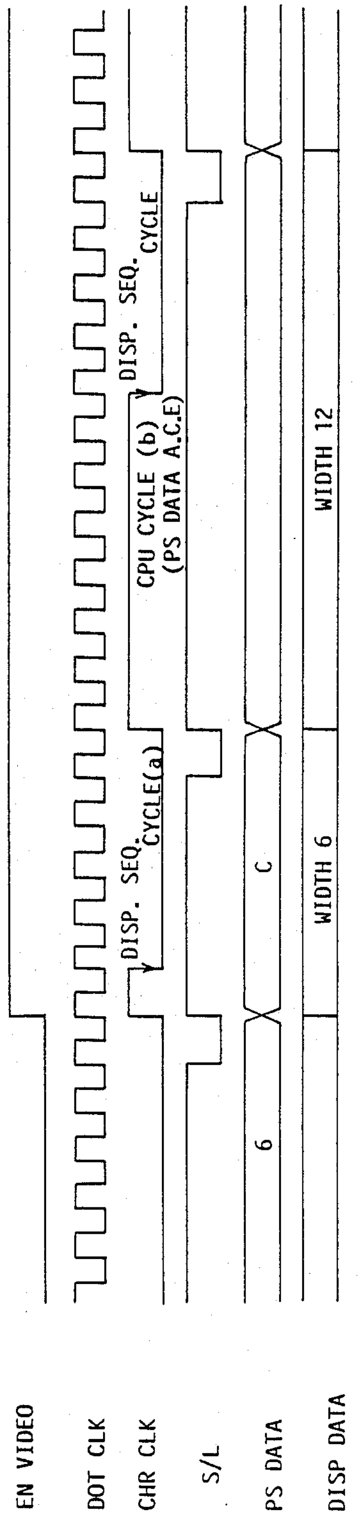
FIG. 4 is a view illustrating waveforms of some of the elements shown in FIG. 1.

The character clock generating circuit 17 comprises a clock generator 18 for generating a 24.8 MHz dot clock for example, a CPU cycle counter 19 for counting dot clock pulses corresponding to the number of clock pulses in the character width data output from the proportional spacing decode memory 13, a display sequencer cycle counter 20 for counting a predetermined number of clock pulses in response to a set strobe generated when the CPU cycle counter 19 is incremented, and an SR flip-flop 21 set by the set strobe generated when the CPU cycle counter 19 is incremented and reset by a reset strobe generated when the display sequencer cycle counter 20 is incremented. The predetermined number of dot clock pulses counted by the display sequencer cycle counter 20 is fixed to a number corresponding to a minimum time period required for making access to the video RAM 5. On the other hand, the number of dot clock pulses counted by the CPU cycle counter 19 is variable with the character width data. Accordingly, the SR flip-flop 21 generates a character clock which, as shown in FIG. 4, comprises a display sequencer cycle (a) having a fixed time period determined by the display sequencer cycle counter 20 and a CPU cycle (b) having a variable time period determined by the CPU cycle counter 19, the two cycles (a) and (b) constituting one character display cycle. The character clock thus produced is fed to the address counter 4, an arbiter 22 and the latches 9 and 11. The CRT controller 3 in the display sequencer 1 receives a fixed frequency clock signal which is produced by dividing the dot clock at a 1/6 divider 23 for example. This is necessary for uniformalizing leading addresses for lines of characters on the display, and for outputting the horizontal synchronizing signal H-SYNC and the vertical synchronizing signal V-SYNC always with a fixed timing.

The address counter 4 is loaded with an address output by the CRT controller 3 at the leading end of each display line in synchronism with the horizontal synchronizing signal. After the leading address is loaded, the address counter 4 increments or decrements the count in accordance with the character clock. Since the character clock has pulsewidths variable with character widths, the address counter 4 is renewed in accordance with a character display width, thereby causing one display cycle and the address renewal to coincide with each other for orderly display.

The arbiter 22 is a circuit for controlling the video RAM 5 in accordance with the CPU cycle and display sequencer cycle in combination. The arbiter 22 provides the video RAM 5 with the strobe signal of the display sequencer during the display sequencer cycle, and renders effective or operative the strobe signal from the CPU and a CPU bus buffer 24 during the CPU cycle only when its cycle period is sufficiently long for making access and there is an access request from the CPU. The present or absence of the access request from the CPU is judged from a fall in the character clock (FIG. 4). When there is an access request, a next CPU cycle is appointed for the access. If the character width for the next CPU cycle is smaller than a predetermined width, then the access of the CPU must wait till a cycle to follow. If this situation continues, the access of the CPU will be kept waiting for a long time. However, there will occur no inconvenience since the display sequencer cycle is not required during a horizontal blanking time which will certainly make the access possible.

The video RAM 5 has the following relationship with a display screen in order to provide the proportional spacing presentation on the display 2. First, the number of printable characters is calculated where minimum pitch characters in character fonts are used with respect to the width of a sheet of paper for use on the typewriter. The number is set for one line and input to a register of display character number in the CRT controller 3. The number is a maximum number of characters for one line printing. By inputting this number to the register of display character number, the display sequencer 1 outputs the head address of each line which is determined by adding the number of characters in one line to the head address of the preceding line. This provides a correct address designation for the video RAM 5.

It is necessary at this time to preset a dividing ratio to the divider 23 so that the clock input to the CRT controller 3 has widths corresponding to the minimum pitch characters.

Figure 5:
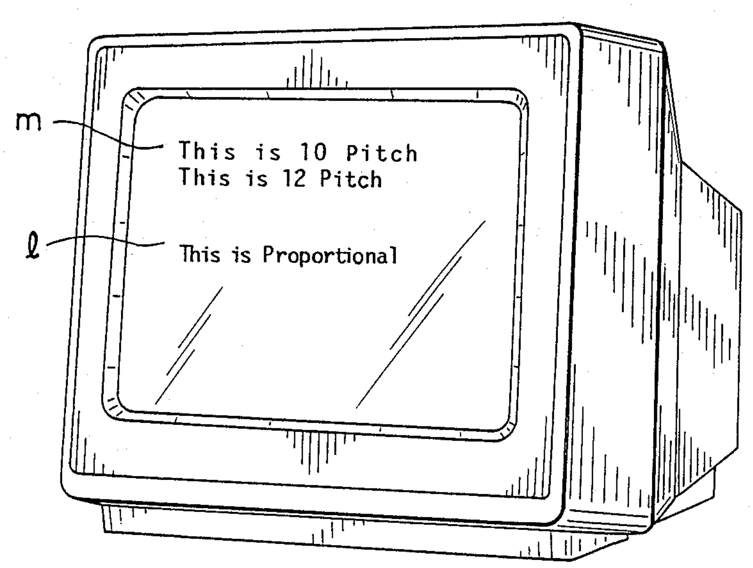
FIG. 5 is a perspective view of a display.

In FIG. 1, number 25 indicates a latch, and numbers 26 and 27 indicate buffers. Through these buffers 26 and 27, the display 2 receives the horizontal and vertical synchronizing signals and the video signal produced by the video RAM 5, character generator 12, shift register 14 and other circuits. Thus, a selected character is displayed with a selected width at a position on the screen corresponding to a raster address designated by the CRT controller 3. FIG. 5 shows a proportional spacing display effected by the described proportional spacing display apparatus, and displays with fixed pitches. In FIG. 5, reference l represents a document displayed with the proportional spacing and reference m represents documents displayed with fixed pitches.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a display apparatus with a proportional spacing control device for displaying characters with spacing corresponding to the types of character, comprising:

data memory means for storing character data;

character data reading means for reading the character data from said data memory means for display;

data rewriting means for rewriting the character data stored in said data memory means;

control means for allocating a character display cycle including a fixed character data reading period for reading by said character data reading means and a variable character data rewriting period in accordance with a width of the character to be displayed; and display means for displaying a character which is read by said character reading means during one character display cycle corresponding to a sum of the character data reading period and the character data rewriting period determined by said control means.

2. A display apparatus as claimed in claim 1, wherein the data rewriting is effected during the data rewriting period having the variable time period in accordance with the widths of the characters only when the time period is sufficiently long for providing access and there is an access request from said rewriting means.

3. In a computerized word processor having a display for use with an editing function and a printer capable of printing characters of variable width, the video display being driven in correlation with a CPU timing cycle which permits data reading and writing to a storage medium which can be addressed for display of characters with proportional spacing equivalent to the proportional spacing of the printed characters, the improvement comprising:

means for providing a character clock signal having a pulse width that is proportional to the width of the character to enable a character display;

means for adjusting the pulse width during a CPU timing cycle, and means for compensating for a shortened data reading and writing time period of a narrow character width during the display cycle of a wider character.

4. The invention of claim 3 further including a constant frequency clock pulse generator connected to the means for adjusting the pulse width.

5. The invention of claim 4 wherein the means for adjusting the pulse width includes a first and second counter and a flip flop, the first counter counting the clock pulses equivalent to a character width and the second counter counting a predetermined number of pulses when the flip flop is set by the first counter.

6. In a display apparatus with a proportional spacing control device for displaying characters with spacing corresponding to types of character, comprising:

a character memory for storing character codes of character to be displayed;

an address counter for providing an address signal to said character memory;

reading means for reading the character code stored in the address indicated by the address counter from the character memory;

dot clock pulse generating means for generating dot clock pulses having a fixed cycle;

character generator for generating dot pattern data in accordance with the character code read by said reading means and for providing the dot pattern data to a display screen in synchronizing with the dot clock pulses to display the characters; and character pulse generating means for generating character pulses having pulse intervals variable with character widths and for providing the character pulses to the address counter, thereby to effect address renewals of the address counter in accordance with the character width, said pulse interval including a fixed period required for said reading means to make access to said character memory for reading the character data from said character memory and a variable period in accordance with widths of the characters.

7. A display apparatus as claimed in claim 6, further comprising rewriting means for rewriting the character data stored in said character memory during said variable period only when the time period is sufficiently long for providing of access to said character memory for the rewriting operation.

* * * * *